United States Patent [19]
Jones

[11] 4,121,232
[45] Oct. 17, 1978

[54] CIRCUMLENS CAMERA ILLUMINATION SYSTEM

[76] Inventor: Kenneth Malcolm Jones, P.O. Box 45, West Tisbury, Mass. 02575

[21] Appl. No.: 739,153

[22] Filed: Nov. 5, 1976

[51] Int. Cl.² ............................................. G03B 15/02
[52] U.S. Cl. .................................... 354/126; 354/62; 362/16
[58] Field of Search ........................... 354/62, 63, 126; 240/2 C, 1.4, 1.3, 4.2; 351/7; 362/3, 8, 16–18

[56] References Cited
U.S. PATENT DOCUMENTS

| | | | |
|---|---|---|---|
| 3,687,030 | 8/1972 | Dine et al. | 354/293 X |
| 4,019,042 | 4/1977 | Baliozian | 354/126 |

FOREIGN PATENT DOCUMENTS 729,315   7/1932   France ........................................ 351/7

Primary Examiner—John Gonzales
Attorney, Agent, or Firm—Blum, Moscovitz, Friedman & Kaplan

[57] ABSTRACT

An array of mirrors is positionable around the lens of a camera for use in combination with flash so that the illumination provided by the array is essentially parallel to and proximate a line from said lens to selected subject matter. This makes it possible to take photographs through an orifice such as the body orifices. The array is collapsible into planar form so that it can be stored in an envelope when not in use.

19 Claims, 3 Drawing Figures

CIRCUMLENS CAMERA ILLUMINATION SYSTEM

BACKGROUND OF THE INVENTION

Photography through an orifice is particularly desirable for medical purposes, such purposes including both diagnosis and teaching. While close-up lenses are readily available, so that it becomes possible to produce photographs of suitable scale, illumination of the subject matter constitutes a serious problem.

The problem of illumination of subject matter on the further side of a relatively small orifice for purposes of photography has been attacked by the use of a discharge tube surrounding the lens. However, such a system is relatively expensive and bulky and cannot readily be adapted for use with "instant"-picture cameras.

In view of the fact that equipment for flash photography, both by means of flashbulb and strobe (electronic flash), is widely available, it would be desirable to be able to adapt such equipment to the aforenoted purpose. However, the flash source is invariably positioned some distance away from the lens, even when the electronic flash is built into the camera body itself. Consequently, conventional flash equipment is unsuitable for illuminating subject matter on the far side of an orifice through which a photograph is to be taken. The present invention is designed to overcome this difficulty.

SUMMARY OF THE INVENTION

To bring the light from a flash source to the vicinity of the lens of a camera with which the flash source is to be used, a first planar mirror is attached to the flash source by means of pressure-sensitive tape and a support strut at an angle such that the light from the flash source is directed toward the camera lens. If desired, the mirror can be attached permanently to the flash source by any convenient means.

Since the flash source is not a point, the light will be distributed more or less uniformly around the lens. Positioned to either side of the lens and below the lens are three mirrors taped together. The mirrors may rest upon the bed of the camera or may be otherwise supported. A fifth mirror, optionally, may be supported immediately above the lens. The mirrors proximate the lens all receive light from the first mirror and are angled to reflect said light essentially in a selected direction which preferably is parallel to the axis of the lens.

Conveniently, a tube may be inserted in the orifice through which the light is to be directed and through which a photograph is to be taken. Coating the inside of the tube provides diffuse reflection of light striking the inside of said tube and provides for greater uniformity of illumination.

The mirrors to either side of the lens and the mirror below the lens are taped together so that they can be laid out in sheet form for storage. The mirror above the lens and the mirror attached to the flash source are held in position by means of pressure-sensitive tape where the adhesive used is of such a nature that separation of the tape from the flash source or from the camera body can be carried out readily and repeatedly. Preferably, a close-up lens is used in combination with the camera lens.

Accordingly, an object of the present invention is an array of mirrors which can readily be positioned in connection with a camera for providing paraxial illumination in combination with a flash source.

Another object of the present invention is a mirror array for use in combination with a flash source and a camera which can readily be attached to and disengaged from said camera.

A further object of the present invention is a mirror array for use in combination with a camera and flash source to provide paraxial illumination and to facilitate photography through an orifice, where said mirror array can be laid out flat for storage.

An important object of the present invention is a mirror array for use in combination with a camera and flash source to be employed for photography through an orifice where the array can be positioned in such a way as to permit the use of a close-up lens fitted to said camera.

A significant object of the present invention is an inexpensive mirror array to be used in combination with a camera and flash source which can be operated by an individual for taking photographs of a portion of the body interior to an orifice by light directed through said orifice.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Generally speaking, in order to take a photograph through an orifice where the light for illumination of the subject matter must also pass through said orifice, for best results, the light for illumination of the subject matter must be proximate to and approximately parallel to the line from the lens to the subject matter. For best results, particularly with respect to freedom from distortion, the subject matter should be close to the axis of the lens. Where the source of light is positioned to one side of the lens, then provision must be made for bringing the light close to the lens and then reflecting the light toward the orifice.

Figure 1:
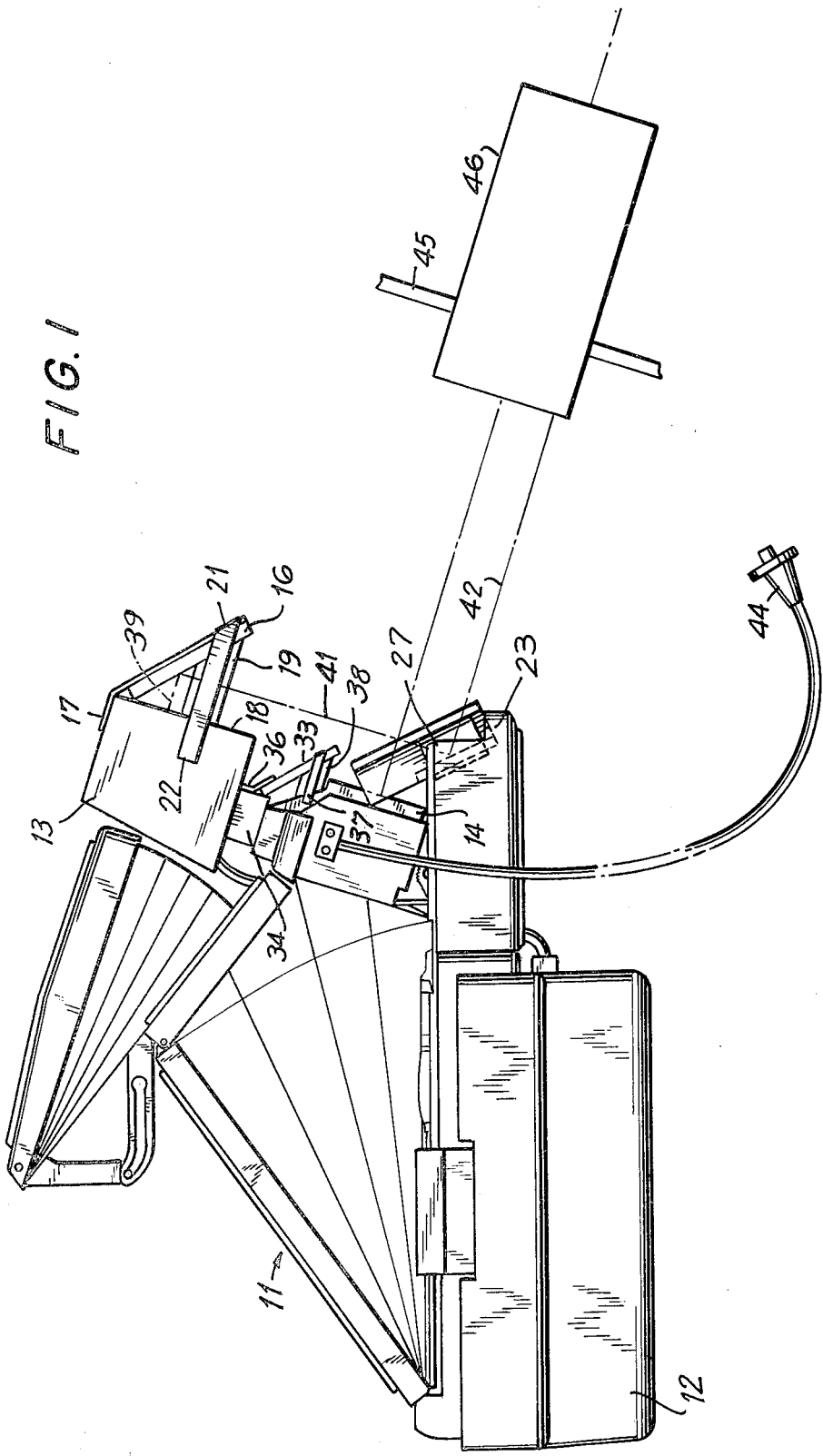
FIG. 1 is a side view of a camera fitted with a strobe and a close-up lens, the mirror array of the present invention being supported on said camera and said strobe.

An embodiment is shown in FIG. 1, wherein a camera is represented generally by the reference numeral 11, a power supply 12 being attached thereto. The camera is shown fitted with a strobe unit 13 and a close-up lens 14 though, of course, photographs can be made without a close-up lens. Nevertheless, where photographs are to be taken through a body orifice, the use of a close-up lens is strongly preferred, a particularly desirable close-up lens being one which provides 1:1, i.e., life-size, photographs. Strobe mirror 16, seen in edge view, is fastened to the top of strobe unit 13 by means of pressure-sensitive tape 17. The angle between mirror 16 and face 18 of strobe unit 13 is set by positioning strut 19 between mirror 16 and strobe unit 13. Conveniently, strut 19 is held in position by tape sections 21 and 22. The strobe unit 13 and power supply 12 as shown in FIG. 1 are available under the tradename ITT Magicflash. The strobe unit having the tradename Nissin FSX and listed as Electronic Flash unit catalogue No. 270001 is also satisfactory.

The angle between mirror 16 and face 18 of strobe unit 13 is set so as to reflect light to mirrors positioned proximate the close-up lens fitted to the lens of the camera. In the Polaroid SX-70 camera, it is found that the optimum angle between the strobe mirror and the face of the strobe is between 42° and 48°. Using the Nissin strobe unit, it is desirable to place a shade above close-up lens mount 14 in order to protect the lens from the strobe light and avoid reflection therefrom.

Figure 2:
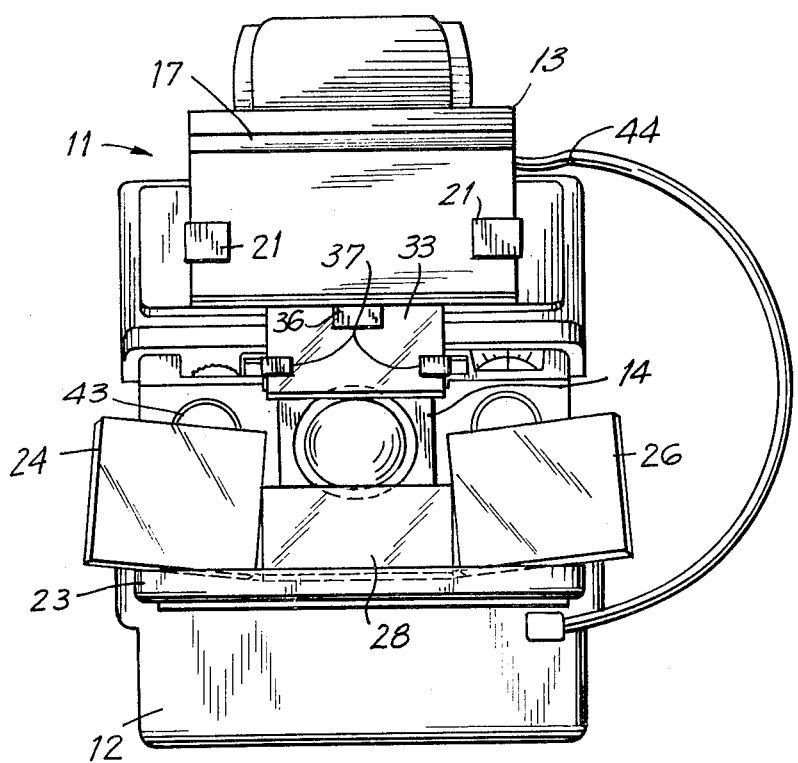
FIG. 2 is a front view of the embodiment shown in FIG. 1.
Figure 3:
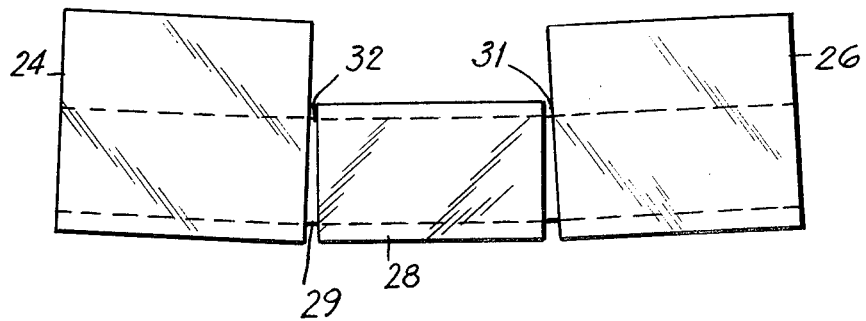
FIG. 3 is a plan view of a three mirrors array, two of which in use, are positioned on either side of a camera lens and the third of which is positioned below said camera lens, said three mirrors being joined by pressure-sensitive tape.

The Polaroid SX-70 camera has a bed indicated by the reference numeral 23 on which a mirror array can be disposed. As best shown in FIG. 2, mirrors 24 and 26 are positioned to either side of close-up lens mount 14. The lenses are tipped back and rest against ledge 27. Between mirrors 24 and 26 is a shorter mirror 28 which is joined to mirrors 24 and 26 by flexible pressure-sensitive tape 29, as indicated in FIG. 3. When set up for use, the three mirrors 24, 28 and 26 do not lie in the same plane. Since the mirrors are of appreciable thickness, a thickness of about 0.1 inches being appropriate, space must be provided between the mirrors so that the faces of the mirrors can be deflected toward each other. This spacing is clearly shown in FIG. 3 and is indicated by the reference numerals 31 and 32. Further, since the bed of the Polaroid SX-70 camera has side ledges, it is desirable that the triple-mirror array be joined together in such a way that the side mirrors can be tipped upwardly. This is provided for by tapering the spaces 31 and 32 on either side of mirror 28, as can be seen in FIG. 3.

Additional light can be captured and directed into the orifice by taping a fifth mirror 33 to bottom portion 34 of strobe unit 13, the tape used for this purpose being indicated by reference numeral 36. As with strobe mirror 16, the angle at which mirror 33 is disposed can be set by means of tape section 37 and strut 38, or by means of a bottom spacer (not shown). Fifth mirror 33 can serve as the shade for the camera lens when the Nissin strobe unit is used.

The course of the light from the strobe unit 13 is indicated by lines 39, 41 and 42. As aforenoted, the strobe unit is not a point source, and consequently, some light also reaches mirror 33 for reflection through an orifice through which the picture is to be taken. The body wall having an orifice therein is represented by the reference numeral 45, which may be the mouth, the anus or the vagina. In FIG. 1, the body wall is shown as being distended by means of a tube 46 inserted therein. However, in the case of a vagina, a speculum is more conveniently used. The interior of device 42 may be coated with a harmless, diffusely reflecting substance, such as magnesium carbonate, to provide for greater uniformity of illumination of the subject matter to be photographed.

Where the SX-70 camera is used, mirror 24 may interfere with access to shutter release 43, in which case, cable release 44 is used. Suitable dimensions for the various mirrors are approximately 40 mm wide by 36 mm high for mirrors 24 and 26, 41 mm wide by 22 mm high for mirror 28, 60 mm wide by 34 mm high for mirror 16, and 40 mm wide by 24 mm high for mirror 33. For mirrors 28 and 33, when used with the Polaroid SX-70, the heights of said mirrors should be 22 ± 0.5 and 24 ± 0.5 mm respectively to assure that the mirrors are held at the proper angles.

As is evident, a number of variations of the mirror arrangement exemplified in the Figures are possible, depending upon the specific camera and the specific light source used. If flashbulbs are used instead of strobe as the light source, then mirror 16 can be taped to a reflector above or behind the flashbulb. Where the camera is other than the Polaroid SX-70, mirrors 24, 26 and 28 can be taped to the front of the camera, using appropriate spacers or struts, if necessary, to provide the dihedral angles between central mirror 28 and side mirrors 24 and 26. The struts, as shown in connection with strut 19, can be taped to the mirrors and to the camera body for ready removal from the camera body.

While maximum illumination is provided in accordance with the present invention by the use of the four mirrors 24, 26, 28 and 33, in addition to strobe mirror 16, special conditions can make it desirable to use, any of the combinations 16 and 28, 16 with 24 and 26, 16 with 33, 16 with 28 and 33 and 16 with 24, 28 and 33. As aforenoted, when the Nissin FSX strobe is used, a shade may be placed over the close-up lens, mirror 33 being satisfactory for this purpose. Furthermore mirror 33 can be used alone in combination with mirror 16.

It is preferable to position the camera so that the orifice through which the photograph is to be taken includes the axis of the camera lens, but it is by no means essential to do so; all that it necessary is that the orifice lie within the field of view of the camera lens and that the mirrors around the camera lens be oriented to reflect the light from the light source parallel to the line from the camera lens to the orifice.

Adjustment of the various mirrors to the optimum angle is easily accomplished by looking in the direction from the orifice to the camera lens and adjusting mirrors 24, 26 an 28 so that mirror 16 comes into view; then mirror 16 is adjusted until the light source comes into view. After these steps are completed, the light from the light source will be parallel to the line joining the lens and the orifice, and the illumination will be satisfactory. This mode of adjusting the mirrors has been found to be sufficiently simple so that an individual can easily and successfully photograph those portions of the individual's body interior to the orifices.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. Apparatus for directing light from a flash source associated with a camera proximate to and approximately parallel to a line from the lens of said camera to selected subject matter, said flash source including a light source and a mounting, comprising a first mirror, first holding means for attaching said first mirror to said mounting, spacer means for orienting said first mirror at a selected first angle in relation to said light source, and at least a second mirror positioned adjacent said lens, said first angle being such that light from said light source is directed to said at least second mirror, said at least second mirror being oriented for making a second angle with the light reflected from said first mirror such that a substantial portion of said reflected light is again reflected proximate to and approximately parallel to said line joining said camera lens and said subject matter, said at least second mirror being positioned for allowing ready access to said camera lens and attachment of a close-up lens.

2. Apparatus as claimed in claim 1, wherein said holding means for attaching said first mirror is pressure-sensitive tape in combination with said spacer means.

3. Apparatus as claimed in claim 1, wherein said at least second mirror is positioned below said lens.

4. Apparatus as claimed in claim 1, wherein said at least second mirror is positioned above said lens.

5. Apparatus as claimed in claim 4, wherein said at least second mirror is held releasably in place by pressure-sensitive tape and second spacer means for orienting said second mirror to direct light received from said first mirror to said selected subject matter.

6. Apparatus as claimed in claim 1, wherein said second mirror is placed to one side of said lens and a third mirror is placed to the other side of said lens and said second and third mirrors are disposed to reflect light from said first mirror proximate to and approximately parallel to said line joining said camera lens and said subject matter.

7. Apparatus as claimed in claim 1, wherein second mirror and third and fourth mirrors are positioned respectively to either side and below said lens and disposed to reflect light from said first mirror proximate to and approximately parallel to said line joining said camera lens and said subject matter.

8. Apparatus as claimed in claim 7, wherein said second, third and fourth mirrors are joined to each other by pressure-sensitive tape.

9. Apparatus as claimed in claim 7, further comprising a fifth mirror mounted above said lens and held to said camera and flash source by pressure-sensitive tape and spacer means for establishing the angle at which said fifth mirror is held, said fifth mirror being disposed to reflect light from said first mirror proximate to and approximately parallel to said line joining said camera lens and said subject matter.

10. Apparatus as claimed in claim 1, further comprising means for shading said lens from the light reflected by said first mirror toward said lens.

11. Apparatus as claimed in claim 1, wherein said flash source is a strobe unit and said second mirror is mounted on one of said strobe unit and the body of said camera.

12. Apparatus as claimed in claim 7, wherein said camera has a bed forward of said camera lens for supporting said second, third and fourth mirrors.

13. Apparatus as claimed in claim 1, wherein said camera lens has thereon a close-up lens.

14. Apparatus as claimed in claim 1, wherein said subject matter is on the far side of an orifice and said light must pass through said orifice to illuminate said subject matter.

15. Apparatus as claimed in claim 1, wherein said line is approximately coincident with the axis of said lens.

16. Apparatus as claimed in claim 7, wherein said second, third and fourth mirrors are mounted on pressure-sensitive tape in spaced relation to facilitate forming dihedral angles between said second and third mirrors and between said third and fourth mirrors.

17. Apparatus as claimed in claim 16, wherein the edges of adjacent mirrors are nonparallel by an amount sufficient to compensate for the combined effects of dihedral angles between said mirrors and the angles between said mirrors and the line from said lens to said subject matter.

18. Apparatus as claimed in claim 1, wherein said second mirror is positioned above said lens and a third mirror is positioned below said lens for reflecting light from said first mirror proximate to and approximately parallel to said line joining said camera lens and said subject matter.

19. A method of illuminating subject matter to be photographed through an orifice, comprising the steps of disposing a first mirror on a flash source associated with a camera, placing at least one mirror proximate to the camera lens, orienting said first mirror to direct light from said flash source to said at least one mirror, and orienting said at least one mirror to reflect light from said first mirror proximate to and approximately parallel to the line joining said camera lens to said subject matter, said first mirror being positioned relative to said flash source with pressure-sensitive tape and oriented by first spacer means for reflecting light from said flash source to said at least one mirror, and said at least one mirror comprises three mirrors positioned below and to either side of said lens, said three mirrors are joined together by pressure-sensitive tape in an array which can be laid out flat, and wherein a mirror is positioned above said lens, said supra-lens mirror is releasably joined to said camera body by pressure-sensitive tape and oriented by second spacer means for reflecting light from said flash source along said line.

* * * * *